(12) United States Patent
Vantassel et al.

(10) Patent No.: US 12,497,920 B2
(45) Date of Patent: Dec. 16, 2025

(54) GAS TURBINE AERODYNAMIC COMPONENT CYCLONIC PARTICLE SEPARATOR WITH MULTIPLE PARTICLE TRAPS

(71) Applicant: GE Infrastructure Technology LLC, Greenville, SC (US)

(72) Inventors: Brad Wilson Vantassel, Greenville, SC (US); Zachary John Snider, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/689,291

(22) PCT Filed: Sep. 9, 2021

(86) PCT No.: PCT/US2021/049555
§ 371 (c)(1),
(2) Date: Mar. 5, 2024

(87) PCT Pub. No.: WO2023/038622
PCT Pub. Date: Mar. 16, 2023

(65) Prior Publication Data
US 2025/0129744 A1 Apr. 24, 2025

(51) Int. Cl.
*F02C 7/052* (2006.01)
*B01D 45/16* (2006.01)
(Continued)

(52) U.S. Cl.
CPC .............. *F02C 7/052* (2013.01); *B01D 45/16* (2013.01); *B04C 3/02* (2013.01); *B04C 3/06* (2013.01);
(Continued)

(58) Field of Classification Search
CPC .... F02C 7/052; F02C 7/18; F01D 9/02; F01D 25/12; F01D 25/24; F01D 25/32;
(Continued)

(56) References Cited

U.S. PATENT DOCUMENTS 1,539,435 A 5/1925 Schutz
3,969,096 A * 7/1976 Richard .................. F01N 3/037
55/455

(Continued)

FOREIGN PATENT DOCUMENTS

IT PD20 100 215 A1 1/2012
JP 2017082792 A 5/2017
(Continued)

OTHER PUBLICATIONS

Japanese Office Action dated Aug. 13, 2025 for related JP Application No. 2024-513276, 8 pages.
(Continued)

*Primary Examiner* — Nathaniel E Wiehe
*Assistant Examiner* — Wayne A Lambert
(74) *Attorney, Agent, or Firm* — Charlotte Wilson; James Pemrick; Hoffman Warnick LLC

(57) ABSTRACT

A cyclonic particle separator may include a housing including a cylindrical sidewall having a plurality of flow entry ports. A cover member closes a first end of the cylindrical sidewall, and a mounting member having a flow exit opening defined therethrough is at a second end of the cylindrical sidewall. At least one particle exit passage is defined in the housing. Each of the plurality of flow entry ports includes a flow directing surface angled to direct a gas flow from upstream of the housing to enter the housing in a tangential direction relative to the cylindrical sidewall, causing a cyclone vortex. The cyclone vortex acts to separate particles from the gas flow.

20 Claims, 12 Drawing Sheets

(51) Int. Cl.
*B04C 3/02* (2006.01)
*B04C 3/06* (2006.01)
*B04C 9/00* (2006.01)
*F01D 9/02* (2006.01)
*F01D 25/12* (2006.01)
*B04C 3/00* (2006.01)

(52) U.S. Cl.
CPC ............... *B04C 9/00* (2013.01); *F01D 9/02* (2013.01); *F01D 25/12* (2013.01); *B04C 2003/006* (2013.01); *B04C 2009/005* (2013.01); *F05D 2220/32* (2013.01); *F05D 2240/12* (2013.01); *F05D 2260/20* (2013.01)

(58) Field of Classification Search
CPC ............ F05D 2220/32; F05D 2240/12; F05D 2260/20; F05D 2260/607; B01D 45/16; B01D 45/12; B04C 3/02; B04C 3/06; B04C 5/04; B04C 9/00; B04C 2003/006; B04C 2009/005
See application file for complete search history.

(56) References Cited

U.S. PATENT DOCUMENTS

| | | | | | |
|---|---|---|---|---|---|
| 4,820,123 | A * | 4/1989 | Hall | ............... | F01D 5/187 416/97 R |
| 5,294,410 | A * | 3/1994 | White | ............... | F02C 7/052 422/177 |
| 5,983,623 | A * | 11/1999 | Aoki | ............... | F01D 5/187 60/806 |
| 6,308,511 | B1 * | 10/2001 | Beeck | ............... | F01D 5/187 415/115 |
| 6,468,426 | B1 * | 10/2002 | Klass | ............... | B04C 3/06 210/512.1 |
| 6,485,536 | B1 * | 11/2002 | Masters | ............... | A47L 9/1608 55/467 |
| 6,702,868 | B2 * | 3/2004 | Oh | ............... | A47L 9/1666 55/413 |
| 6,896,720 | B1 * | 5/2005 | Arnold | ............... | B04C 5/26 95/271 |
| 7,662,202 | B2 * | 2/2010 | Oh | ............... | B04C 5/14 55/447 |
| 7,806,950 | B2 * | 10/2010 | Han | ............... | A47L 9/1633 55/429 |
| 8,083,824 | B2 * | 12/2011 | Fujiyama | ............... | B04C 5/06 55/444 |
| 8,746,464 | B2 * | 6/2014 | Maier | ............... | B04C 11/00 210/197 |
| 8,943,791 | B2 * | 2/2015 | Tibbott | ............... | F01D 9/065 60/39.092 |
| 10,563,579 | B2 * | 2/2020 | Duge | ............... | B03C 3/0175 |
| 10,941,664 | B2 * | 3/2021 | Osgood | ............... | F04D 29/582 |
| 11,033,845 | B2 * | 6/2021 | Stone | ............... | F02C 7/052 |
| 11,598,222 | B2 * | 3/2023 | Ratzlaff | ............... | B04C 3/06 |
| 2005/0002778 | A1 * | 1/2005 | Fried | ............... | F01D 5/082 415/169.1 |
| 2007/0048127 | A1 * | 3/2007 | O'Neill | ............... | F01D 25/002 415/169.1 |
| 2009/0133370 | A1 * | 5/2009 | Yoo | ............... | A47L 9/165 55/455 |
| 2016/0040639 | A1 * | 2/2016 | McCarthy | ............... | F02M 37/0076 210/512.1 |
| 2016/0363051 | A1 * | 12/2016 | Snyder | ............... | B01D 45/16 |
| 2019/0184321 | A1 | 6/2019 | Nakahara | | |
| 2020/0300163 | A1 * | 9/2020 | Osgood | ............... | F01D 25/32 |
| 2020/0300266 | A1 | 9/2020 | Osgood et al. | | |

FOREIGN PATENT DOCUMENTS

| | | |
|---|---|---|
| JP | 2018524517 A | 8/2018 |
| JP | 2018051506 A | 8/2020 |
| WO | 2019111773 A1 | 6/2019 |
| WO | 2020/066294 A1 | 4/2020 |

OTHER PUBLICATIONS

Japanese Office Action dated Jun. 11, 2025 for related JP Application No. 2024-513273, 9 pages.

* cited by examiner

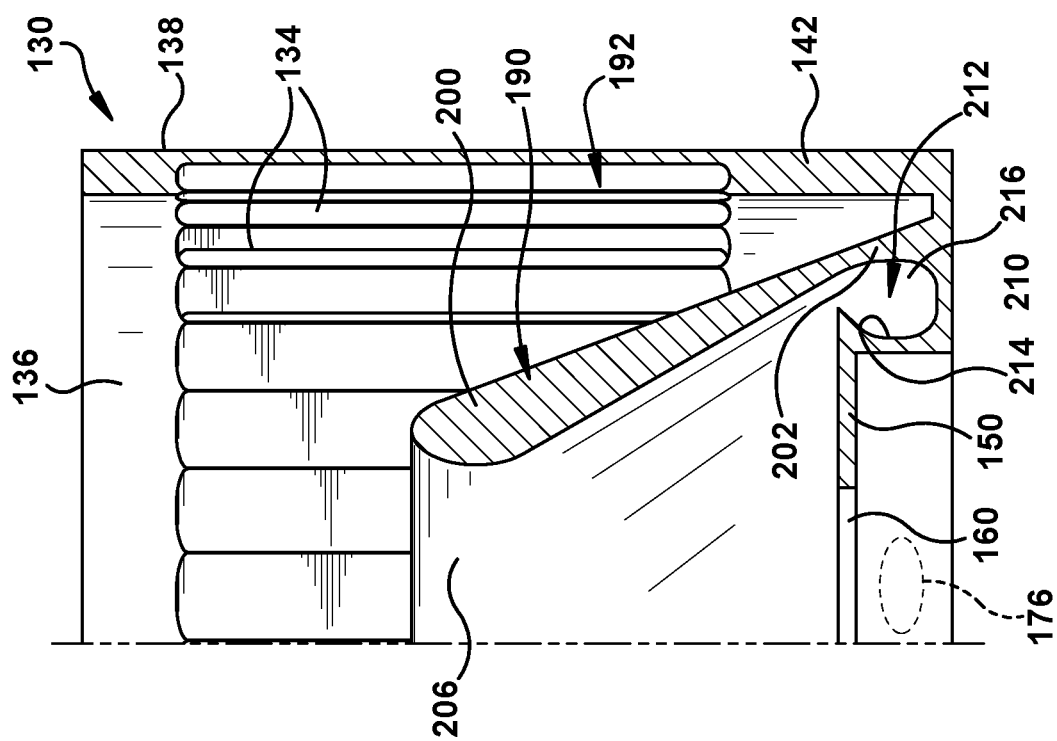
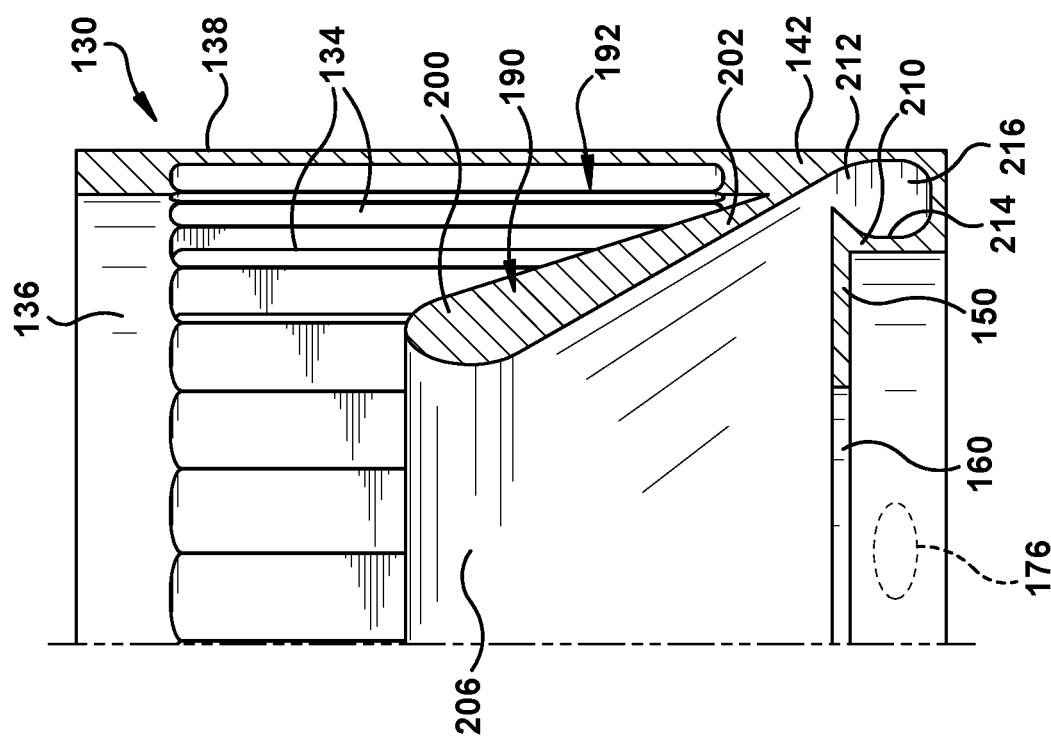

GAS TURBINE AERODYNAMIC COMPONENT CYCLONIC PARTICLE SEPARATOR WITH MULTIPLE PARTICLE TRAPS

TECHNICAL FIELD

The disclosure relates generally to particle separators and, more particularly, to a cyclonic particle separator including a housing having a cylindrical sidewall with a plurality of flow entry ports defined therethrough. A related turbine vane and turbine system are also provided.

BACKGROUND

A wide variety of industrial machines use an air flow that needs to be cleaned of particles, for example, dust, dirt, or soot. One industrial machine that uses a cleaned air flow includes a turbine system, such as a gas turbine (GT) system. In a GT system, an air flow from a compressor is used for combustion purposes and for cooling purposes. For example, an air flow may be directed into cooling circuits in airfoils of the turbine vanes or blades of a GT system to prevent the airfoils from overheating from the hot combustion gases that pass over the vanes or blades. The cooling circuit typically includes a number of very small cooling passages that take complex paths through the airfoil. Particles can clog the cooling passages if not removed prior to entering the cooling circuit. Current approaches employ various particle separators or collectors that are integral parts of the turbine vane or blade. Consequently, these separators or collectors cannot be retrofitted to older turbine vanes or blades, and they cannot be customized for certain vanes or blades.

Centrifugal or cyclonic separators have been used previously to clean air flows. These separators are ineffective for use in sensitive industrial equipment such as a GT system because they are too large and create too large of a pressure drop. Where the flow may be used for cooling, the large pressure drop limits the cooling effectiveness of the flow downstream of the separator.

BRIEF DESCRIPTION

All aspects, examples, and features mentioned below can be combined in any technically possible way.

An aspect of the disclosure provides a cyclonic particle separator, comprising: a housing including: a cylindrical sidewall having a plurality of flow entry ports defined therethrough, a cover member closing a first end of the cylindrical sidewall, and a mounting member at a second end of the cylindrical sidewall and having a flow exit opening defined therethrough; and at least one particle exit passage defined in the housing; and wherein each of the plurality of flow entry ports includes a flow directing surface angled to direct a gas flow from upstream of the housing to enter the housing in a tangential direction relative to the cylindrical sidewall, causing a cyclone vortex.

Another aspect of the disclosure includes any of the preceding aspects, and further comprises an annular body located within the cylindrical sidewall, the annular body defining a cyclonic separating chamber between an interior of the cylindrical sidewall and the annular body.

Another aspect of the disclosure includes any of the preceding aspects, and the annular body has a smaller end proximate the cover member and a larger end proximate the mounting member.

Another aspect of the disclosure includes any of the preceding aspects, and the annular body has a frustoconical shape having the smaller end proximate the cover member and the larger end proximate the mounting member.

Another aspect of the disclosure includes any of the preceding aspects, and further comprises a wall extending between the flow exit opening and one of the larger end of the annular body and the cylindrical sidewall, the wall defining an annular particle trap with the cylindrical sidewall, wherein the at least one particle exit passage includes a first particle exit passage in fluid communication with the annular particle trap.

Another aspect of the disclosure includes any of the preceding aspects, and the annular particle trap has a torus shape.

Another aspect of the disclosure includes any of the preceding aspects, and the at least one particle exit passage includes a first particle exit passage defined in the cylindrical sidewall of the housing adjacent the cover member, and a second particle exit passage defined in the cylindrical sidewall of the housing adjacent the mounting member.

Another aspect of the disclosure includes any of the preceding aspects, and the at least one particle exit passage includes a single particle exit passage adjacent the mounting member.

Another aspect of the disclosure includes any of the preceding aspects, and the housing is operatively mounted to one of an inner endwall and an outer endwall of a turbine vane by the mounting member, and wherein the flow exit opening is defined in a wall of the mounting member and is in fluid communication with a cooling circuit downstream of the housing in an interior of an airfoil of the turbine vane.

An aspect of the disclosure relates to a turbine vane, comprising: an inner endwall; an outer endwall; an airfoil coupling the inner endwall and the outer endwall; and a cyclonic particle separator including: a housing including: a cylindrical sidewall having a plurality of flow entry ports defined therethrough, a cover member closing a first end of the cylindrical sidewall, and a mounting member at a second end of the cylindrical sidewall configured to couple the housing to one of the inner endwall and the outer endwall, wherein the mounting member has a flow exit opening defined therethrough and in fluid communication with a cooling circuit downstream of the housing in an interior of the airfoil; and at least one particle exit passage defined in the housing, wherein each of the plurality of flow entry ports includes a flow directing surface angled to direct a gas flow from upstream of the housing to enter the housing in a tangential direction relative to the cylindrical sidewall, causing a cyclone vortex.

Another aspect of the disclosure includes any of the preceding aspects, and further comprises an annular body located within the cylindrical sidewall, the annular body defining a cyclonic separating chamber between an interior of the cylindrical sidewall and the annular body.

Another aspect of the disclosure includes any of the preceding aspects, and the annular body has a smaller end proximate the cover member and a larger end proximate the mounting member.

Another aspect of the disclosure includes any of the preceding aspects, and the annular body has a frustoconical shape having the smaller end proximate the cover member and the larger end proximate the mounting member.

Another aspect of the disclosure includes any of the preceding aspects, and further comprises a wall extending between the flow exit opening and one of the larger end of the annular body and the cylindrical sidewall, the annular wall defining an annular particle trap, wherein the at least one particle exit passage includes a first particle exit passage in fluid communication with the annular particle trap.

Another aspect of the disclosure includes any of the preceding aspects, and the annular particle trap has a torus shape.

Another aspect of the disclosure includes any of the preceding aspects, and the at least one particle exit passage includes a first particle exit passage defined in the cylindrical sidewall adjacent the first end closed by the cover member, and a second particle exit passage defined in the cylindrical sidewall adjacent the mounting member.

An aspect of the disclosure includes a turbine system, comprising: an engine core including a compressor, a combustor, and a turbine operatively coupled together, the turbine including a plurality of vanes in a turbine stage, each vane including an inner endwall, an outer endwall, and an airfoil coupling the inner endwall and the outer endwall; a cyclonic particle separator mounted to one of the inner endwall and the outer endwall of each vane, the cyclonic particle separator including a housing including: a cylindrical sidewall having a plurality of flow entry ports defined therethrough, a cover member closing a first end of the cylindrical sidewall, and a mounting member at a second end of the cylindrical sidewall configured to couple the housing to one of the inner endwall and the outer endwall, wherein the mounting member has a flow exit opening defined therethrough and in fluid communication with a cooling circuit downstream of the housing in an interior of the airfoil; and at least one particle exit passage defined in the housing.

Another aspect of the disclosure includes any of the preceding aspects, and further comprises an annular body located within the cylindrical sidewall within at least one of the cyclonic particle separators, the annular body defining a cyclonic separating chamber between an interior of the cylindrical sidewall and the annular body.

Another aspect of the disclosure includes any of the preceding aspects, and the annular body has a smaller end proximate the cover member and a larger end proximate the mounting member.

Another aspect of the disclosure includes any of the preceding aspects, and the annular body has a frustoconical shape having the smaller end proximate the cover member and the larger end proximate the mounting member.

Another aspect of the disclosure includes any of the preceding aspects, and further comprises an annular wall extending between the flow exit opening and one of the larger end of the annular body and the cylindrical sidewall, the annular wall defining an annular particle trap, wherein the at least one particle exit passage includes a first particle exit passage in fluid communication with the annular particle trap.

Another aspect of the disclosure includes any of the preceding aspects, and the at least one particle exit passage includes a first particle exit passage defined in the cylindrical sidewall adjacent the cover member, and a second particle exit passage defined in the cylindrical sidewall adjacent the mounting member.

Another aspect of the disclosure includes any of the preceding aspects, and further comprises a conduit fluidly coupling the at least one particle exit passage to a hot gas path of the turbine.

An aspect of the disclosure also includes a cyclonic particle separator, comprising: a housing including a cylindrical sidewall having a plurality of flow entry ports defined therethrough and having a first diameter, a cover member closing a first end of the cylindrical sidewall, and a mounting member at a second end of the cylindrical sidewall, the mounting member having a flow exit opening defined therein and having a second diameter; and at least one particle exit passage defined in the housing, wherein a difference between the first diameter and the second diameter is greater than a 12.5 millimeters.

Another aspect of the disclosure includes any of the preceding aspects, and the at least one particle exit passage defined in the cylindrical sidewall has a diameter of greater than or equal to 0.76 millimeters.

Another aspect of the disclosure includes any of the preceding aspects, and the at least one particle exit passage extends tangentially relative to the cylindrical sidewall.

Another aspect of the disclosure includes any of the preceding aspects, and the at least one particle exit passage extends to a location having a lower pressure than the housing.

Another aspect of the disclosure includes any of the preceding aspects, and an area of an inner annulus of the cylindrical sidewall is at least 1.5 times a sum of areas of the plurality of flow entry ports.

Another aspect of the disclosure includes any of the preceding aspects, and further comprises an annular body located within the cylindrical sidewall, the annular body defining an annular cyclonic separating chamber between an interior of the cylindrical sidewall and the annular body, wherein an annular area between a radial outer end of the annular body and an interior of the cylindrical sidewall is at least as large as a sum of areas of the plurality of flow entry ports.

Another aspect of the disclosure includes any of the preceding aspects, and an area of a central opening defined in the annular body is at least as large as the sum of areas of the plurality of flow entry ports.

An aspect of the disclosure includes a turbine vane, comprising: an inner endwall; an outer endwall; an airfoil coupling the inner endwall and the outer endwall; and a cyclonic particle separator mounted to one of the inner endwall and the outer endwall, the cyclonic particle separator including: a housing including a cylindrical sidewall having a plurality of flow entry ports defined therethrough and having a first diameter, a cover member closing a first end of the cylindrical sidewall, and a mounting member at a second end of the cylindrical sidewall configured to couple the housing to at least one of the inner endwall and the outer endwall, wherein the mounting member has a flow exit opening defined therethrough and in fluid communication with a cooling circuit downstream of the housing in an interior of the airfoil, the flow exit opening having a second diameter; and at least one particle exit passage defined in the housing, wherein a difference between the first diameter and the second diameter is greater than 12.5 millimeters.

Another aspect of the disclosure includes any of the preceding aspects, and the at least one particle exit passage defined in the cylindrical sidewall has a diameter of greater than or equal to 0.76 millimeters.

Another aspect of the disclosure includes any of the preceding aspects, and the at least one particle exit passage extends tangentially relative to the cylindrical sidewall.

Another aspect of the disclosure includes any of the preceding aspects, and the at least one particle exit passage extends through the mounting member.

Another aspect of the disclosure includes any of the preceding aspects, and an area of an inner annulus of the cylindrical sidewall is at least 1.5 times a sum of areas of the plurality of flow entry ports.

Another aspect of the disclosure includes any of the preceding aspects, and further comprises an annular body located within the cylindrical sidewall, the annular body defining an annular cyclonic separating chamber between an interior of the cylindrical sidewall and the annular body, wherein an annular area between a radial outer end of the annular body and an interior of the cylindrical sidewall is at least as large as a sum of areas of the plurality of flow entry ports.

Another aspect of the disclosure includes any of the preceding aspects, and an area of a central opening defined in the annular body is at least as large as the sum of areas of the plurality of flow entry ports.

An aspect of the disclosure relates to a gas turbine system, comprising: an engine core including a compressor, a combustor, and a turbine operatively coupled together, the turbine including a plurality of vanes in a turbine stage, each vane of the turbine stage including an inner endwall, an outer endwall, and an airfoil coupling the inner endwall and the outer endwall; a cyclonic particle separator mounted to one of the inner endwall and the outer endwall of each vane, the cyclonic particle separator including: a housing including a cylindrical sidewall having a plurality of flow entry ports defined therethrough and having a first diameter, a cover member closing a first end of the cylindrical sidewall, and a mounting member at a second end of the cylindrical sidewall configured to couple the housing to one of the inner endwall and the outer endwall, wherein the mounting member has a flow exit opening defined therethrough and in fluid communication with a cooling circuit downstream of the housing in an interior of the airfoil, the flow exit opening having a second diameter; and at least one particle exit passage defined in the housing, wherein a difference between the first diameter and the second diameter is greater than 12.5 millimeters.

Another aspect of the disclosure includes any of the preceding aspects, and an area of an inner annulus of the cylindrical sidewall is at least 1.5 times a sum of areas of the plurality of flow entry ports.

Another aspect of the disclosure includes any of the preceding aspects, and further comprising an annular body located within the cylindrical sidewall in at least one of the cyclonic particle separators, the annular body defining an annular cyclonic separating chamber between an interior of the cylindrical sidewall and the annular body, wherein an annular area between a radial outer end of the annular body and an interior of the cylindrical sidewall is at least as large as a sum of areas of the plurality of flow entry ports.

Another aspect of the disclosure includes any of the preceding aspects, and an area of a central opening defined in the annular body is at least as large as the sum of areas of the plurality of flow entry ports.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 9 is an enlarged cross-sectional view of an annular particle trap, according to embodiments of the disclosure;

FIG. 10 is an enlarged cross-sectional view of an annular particle trap, according to other embodiments of the disclosure;

Figure 1:
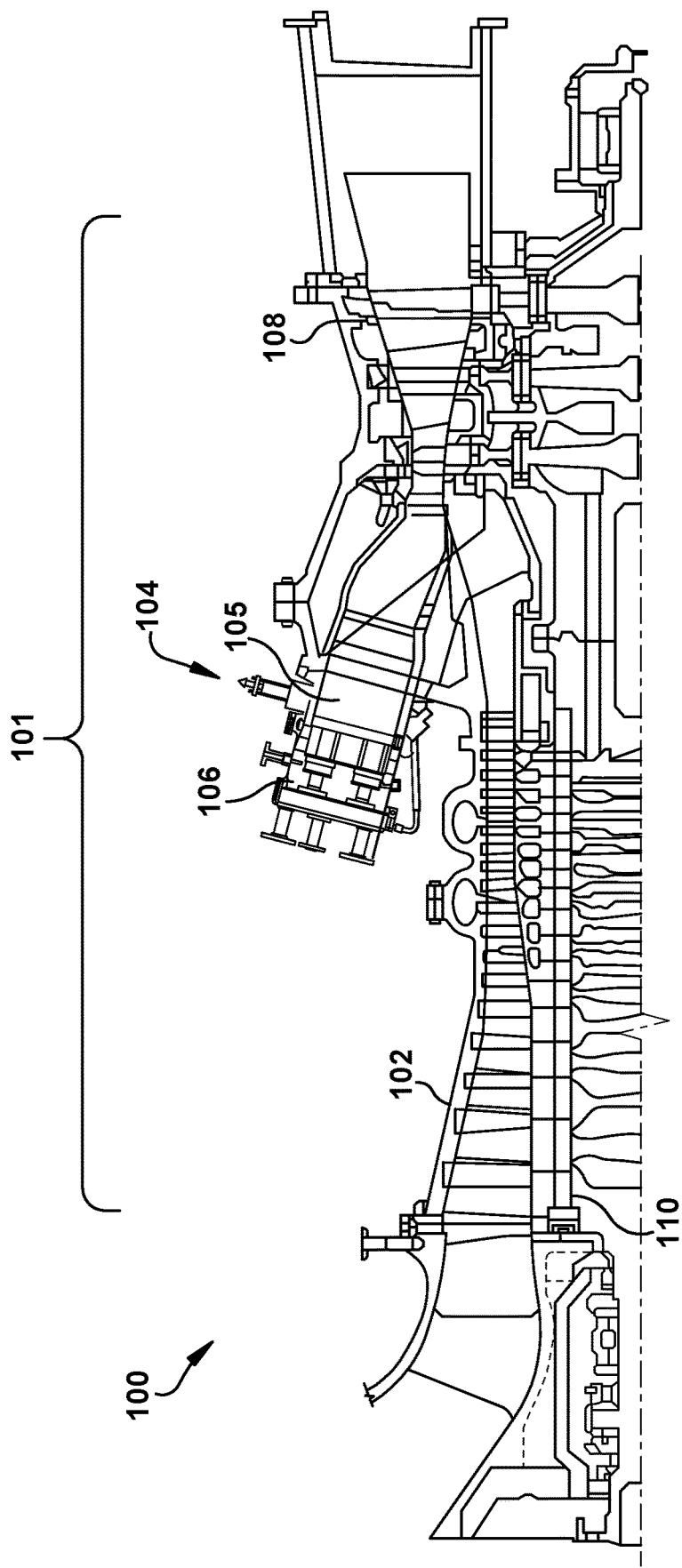
FIG. 1 is a schematic view of an illustrative turbine system in which embodiments of the disclosure can be used.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within an industrial machine employing a cyclonic separator such as a turbine system. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine or, for example, the flow of air through the combustor or coolant through one of the turbine's component systems. The term "downstream" corresponds to the direction of flow of the fluid, and the term "upstream" refers to the direction opposite to the flow (i.e., the direction from which the flow originates). The terms "forward" and "aft," without any further specificity, refer to directions, with "forward" referring to the front or compressor end of the turbomachine, and "aft" referring to the rearward section of the turbomachine.

It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the gas turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a cyclonic particle separator. The cyclonic particle separator may include a housing including a cylindrical sidewall having a plurality of flow entry ports defined therethrough. The housing may also include a cover member closing a first end of the cylindrical sidewall, and a mounting member at a second end of the cylindrical sidewall. The mounting member may have a flow exit opening defined therethrough. At least one particle exit passage is defined in the housing. Each of the plurality of flow entry ports includes a flow directing surface angled to direct a gas flow from upstream of the housing to enter the housing in a tangential direction relative to the cylindrical sidewall, causing a cyclone vortex. The cyclone vortex acts to separate particles from the gas flow.

In certain embodiments, the cylindrical sidewall may have a first diameter and the flow exit opening may have a second diameter, where a difference between the first diameter and the second diameter is greater than 12.5 millimeters (approximately 0.5 inches). The cyclonic particle separator can be used in practically any industrial machine requiring a clean gas flow but will be described herein as applied to a turbine vane in a turbine system. The cyclonic particle separator provides a small profile for application in small areas, such as an endwall of a turbine vane. The flow entry ports in the cylindrical sidewall, among other structure described herein, allow particle separation without a significant pressure drop that would negatively impact subsequent use of the compressed gas flow, for example, for cooling purposes downstream of the separator in a cooling circuit of a turbine vane.

FIG. 1 is a schematic illustration of an illustrative turbine system 100 in the form of a gas turbine (GT) system. Turbine system 100 includes an engine core 101 including a compressor 102, a combustor 104, and a turbine 108 operatively coupled together. Combustor 104 includes a combustion region 105 and a fuel nozzle assembly 106. Turbine system 100 may also include a common compressor/turbine shaft 110 (sometimes referred to as rotor 110). In one embodiment, turbine system 100 is a 7HA.03 engine, commercially available from General Electric Company, Greenville, S.C. The present disclosure is not limited to any one particular GT system and may be used in connection with other turbine systems including, for example, the other HA, F, B, LM, GT, TM and E-class engine models of General Electric Company, and engine models of other companies. As noted, a cyclonic particle separator, as described herein, can also be used on a variety of industrial machines other than a turbine system. In a turbine system, the gas being cleaned by the cyclonic particle separator is air, but the gas may be other than air in other industrial machines.

Figure 2:
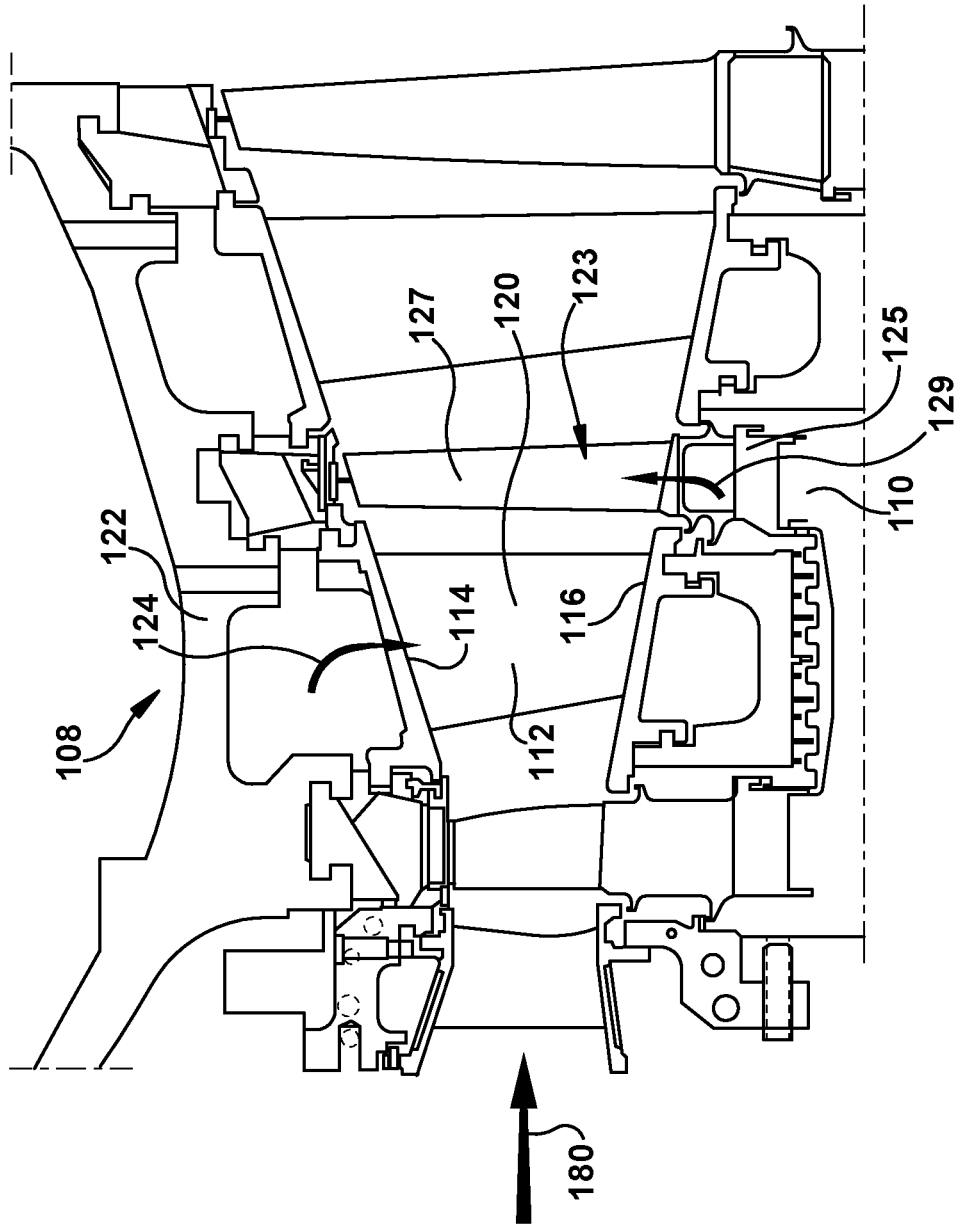
FIG. 2 is a cross-section view of an illustrative turbine assembly with three turbine stages that may be used with the turbine system in FIG. 1.

FIG. 2 is cross-sectional view of an illustrative turbine 108 with three stages of blades and nozzles that may be used with turbine system 100 in FIG. 1. Turbine 108 may include more or fewer stages than shown. Turbine 108 includes a plurality of vanes 112 (into and out of page) arranged in a turbine stage. Each vane 112 includes a (radially) outer endwall 114, a (radially) inner endwall 116, and an airfoil 120 coupling outer endwall 114 and inner endwall 116. Vanes 112 are held in a casing 122 of turbine 108 by outer endwall 114. As understood, a compressed gas (air) flow 124 passes through casing 122 from compressor 102 (FIG. 1) and enters cooling circuits (not shown in FIG. 2) in vanes 112 to cool the vanes. Turbine 108 also includes a plurality of rotating blades 123 (into and out of page), which, with the adjacent upstream vanes 112, define a turbine stage. Each blade 123 includes a base 125 coupled to rotor 110 and an airfoil 127 extending from base 125. As understood, a compressed air flow 129 passes through base 125 from compressor 102 (FIG. 1) and enters cooling circuits (not shown in FIG. 2) in blades 123 to cool the blades.

Referring to FIGS. 1 and 2, in operation, air flows through compressor 102, and compressed air is supplied to combustor 104. Specifically, the compressed air is supplied to fuel nozzle assembly 106 that is integral to combustor 104. Assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel to produce combustion gases. Combustor 104 is in flow communication with turbine 108 in which gas stream thermal energy is converted to mechanical rotational energy through a hot gas path 180 of turbine 108. Turbine 108 is rotatably coupled to and drives rotor 110. Combustion gases directed by vanes 112 turn blades 123 and rotor 110. Compressor 102 may also be rotatably coupled to shaft 110. In the illustrative embodiment, there is a plurality of combustors 104 and fuel nozzle assemblies 106.

Figure 3:
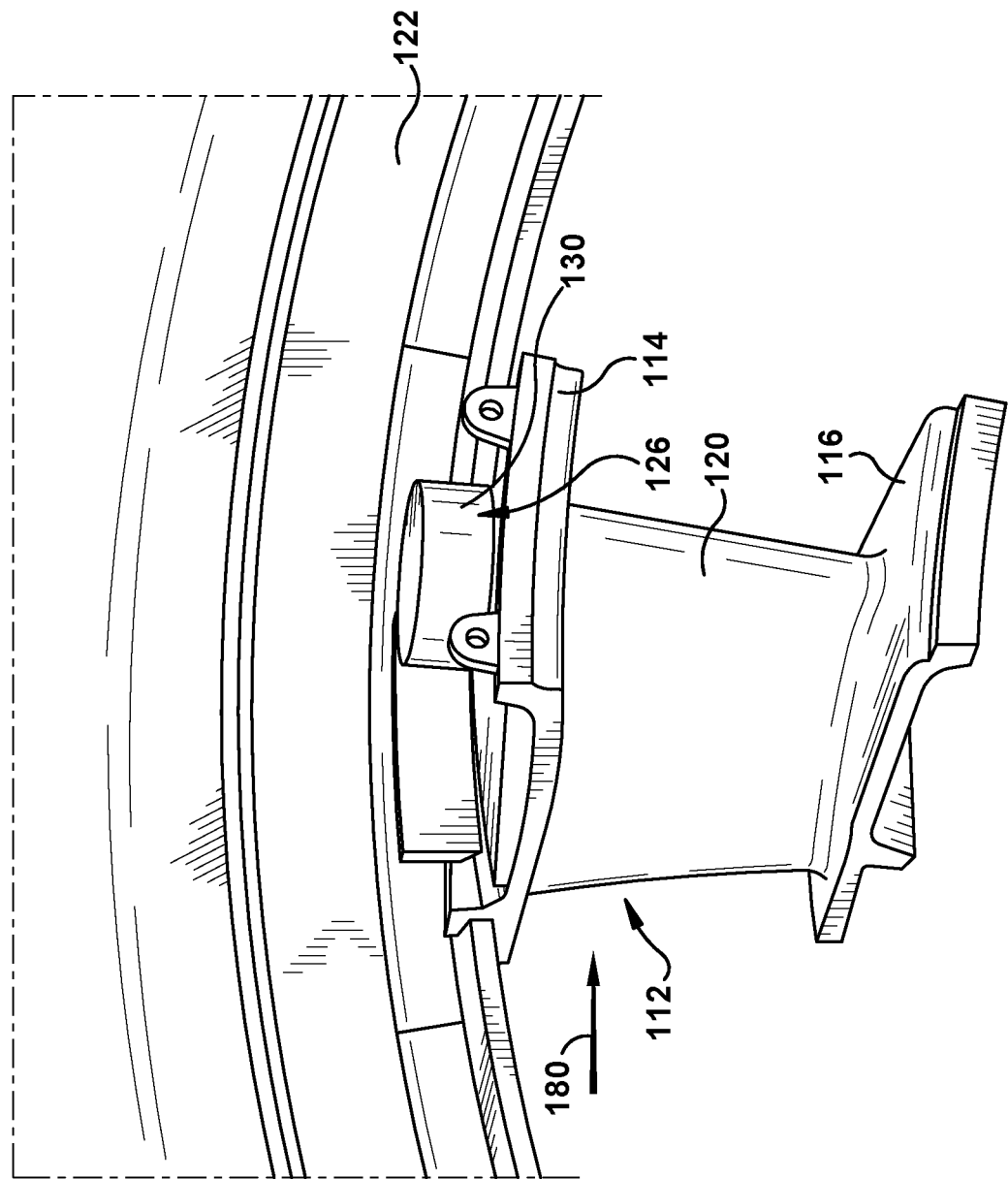
FIG. 3 is a perspective view of a turbine vane including a cyclonic particle separator that may be used with the turbine assembly of FIG. 2, according to embodiments of the disclosure.
Figure 4:
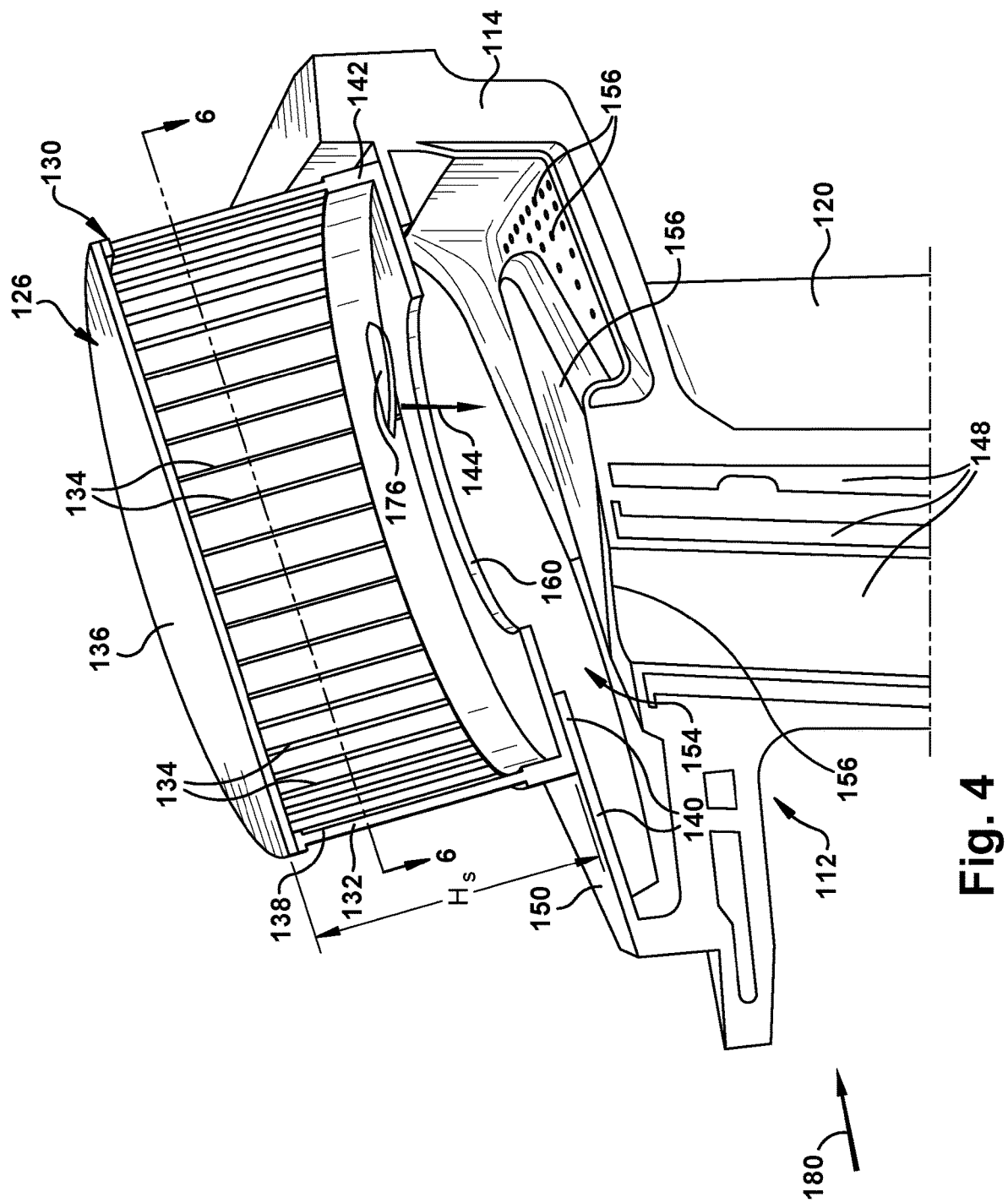
FIG. 4 is a cross-sectional view of the cyclonic particle separator and the turbine vane of FIG. 3, according to embodiments of the disclosure.
Figure 5:
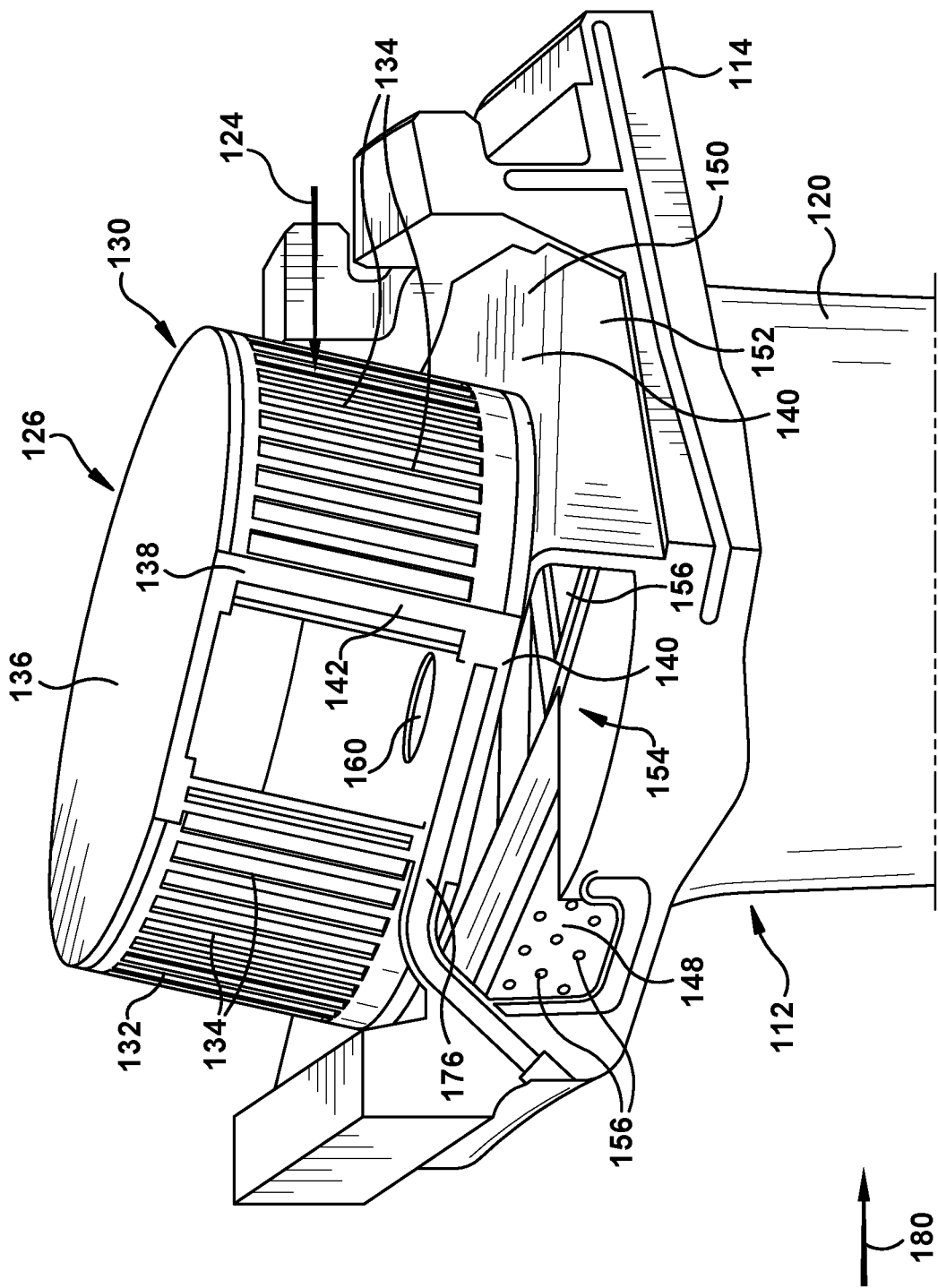
FIG. 5 is a partial cross-sectional view of the cyclonic particle separator of FIG. 3, according to embodiments of the disclosure.

FIG. 3 shows a perspective view of a single illustrative vane 112 including a cyclonic particle separator 126 (hereinafter "separator 126") on outer endwall 114 thereof. In certain embodiments, separator 126 may be mounted to one of inner endwall 116 (see FIG. 11) and outer endwall 114 (as shown) of one or more vanes 112 in turbine system 100. In another embodiment, shown in FIG. 12, a separator 126 may be mounted to both inner endwall 116 and outer endwall 114 of one or more vanes 112 in turbine system 100. For description purposes, FIG. 4 shows a cross-sectional view of separator 126 on outer endwall 114 of turbine vane 112; and FIG. 5 shows a partial cross-sectional view of separator 126 on outer endwall 114.

Separator 126 includes a housing 130. As shown best in FIGS. 4 and 5, housing 130 includes a cylindrical sidewall 132 having a plurality of flow entry ports 134 defined therethrough. A gas flow 124 (see e.g., FIG. 2) may flow from outside of cylindrical housing 132, e.g., from within casing 122 (FIG. 2), through flow entry ports 134 to an interior of cylindrical housing 132. Housing 130 includes a cover member 136 closing a first end 138 of cylindrical sidewall 132. Housing 130 also includes a mounting member 140 at a second end 142 of cylindrical sidewall 132.

Housing 130 can be made of any material capable of withstanding the environment in which employed. Cylindrical sidewall 132 may have some minor variance from perfectly cylindrical but is sufficiently curved to create a cyclone vortex 170 (FIG. 6) of a gas flow 124 entering through plurality of flow entry ports 134 ("flow entry ports 134"). Flow entry ports 134 may be arranged in a number of ways. In FIG. 4, a single row of flow entry ports 134 extends most of a height $H_s$ of cylindrical wall 132. In another example, shown in FIG. 13, flow entry ports 134 are arranged in a pair of radially spaced rows 230A, 230B. Different arrangements of flow entry ports 134 are also possible.

Cover member 136 can be any structural member capable of fluidly closing first end 138 of cylindrical sidewall 132. In the example shown, cover member 136 is a planar plate coupled to first end of cylindrical sidewall 132. However, in other embodiments, cover member 136 may have inner surfaces (not shown) configured to impact a cyclone vortex 170 (FIG. 6) formed in cylindrical sidewall 132 in a positive manner to improve particle separation and/or pressure loss.

Mounting member 140 may include any structure capable of fluidly coupling housing 130 to, for example, outer endwall 114 such that a cleaner gas flow 144 (FIG. 4), e.g., air, exiting housing 130 is fluidly communicated to a subsequent use, such as a cooling circuit 148 (FIG. 4) in airfoil 120 of turbine vane 112. In the non-limiting example shown, mounting member 140 includes a wall 150 (e.g., a plate element) and any number of coupling walls 152 (FIG. 5) for coupling to outer endwall 114 to form a manifold 154. Mounting member 140 can take a variety of different forms depending on the structure to which separator 126 is coupled. In any event, mounting member 140 includes a flow exit opening 160 defined therethrough, e.g., through wall(s) 150, 152 of mounting member 140. Flow exit opening 160 is in fluid communication with, for example, one or more openings 156 in airfoil 120 (and perhaps outer endwall 114) via manifold 154 such that cleaner gas flow 144 (air) passing through flow exit opening 160 enters at least cooling circuit 148 in airfoil 120. Cooling circuit 148 in airfoil 120 and/or outer endwall 114 can take any now known or later developed form, but typically includes one or more openings 156 in outer endwall 114 that are in fluid communication with manifold 154 so cleaner gas flow 144 can enter openings 156.

Figure 6:
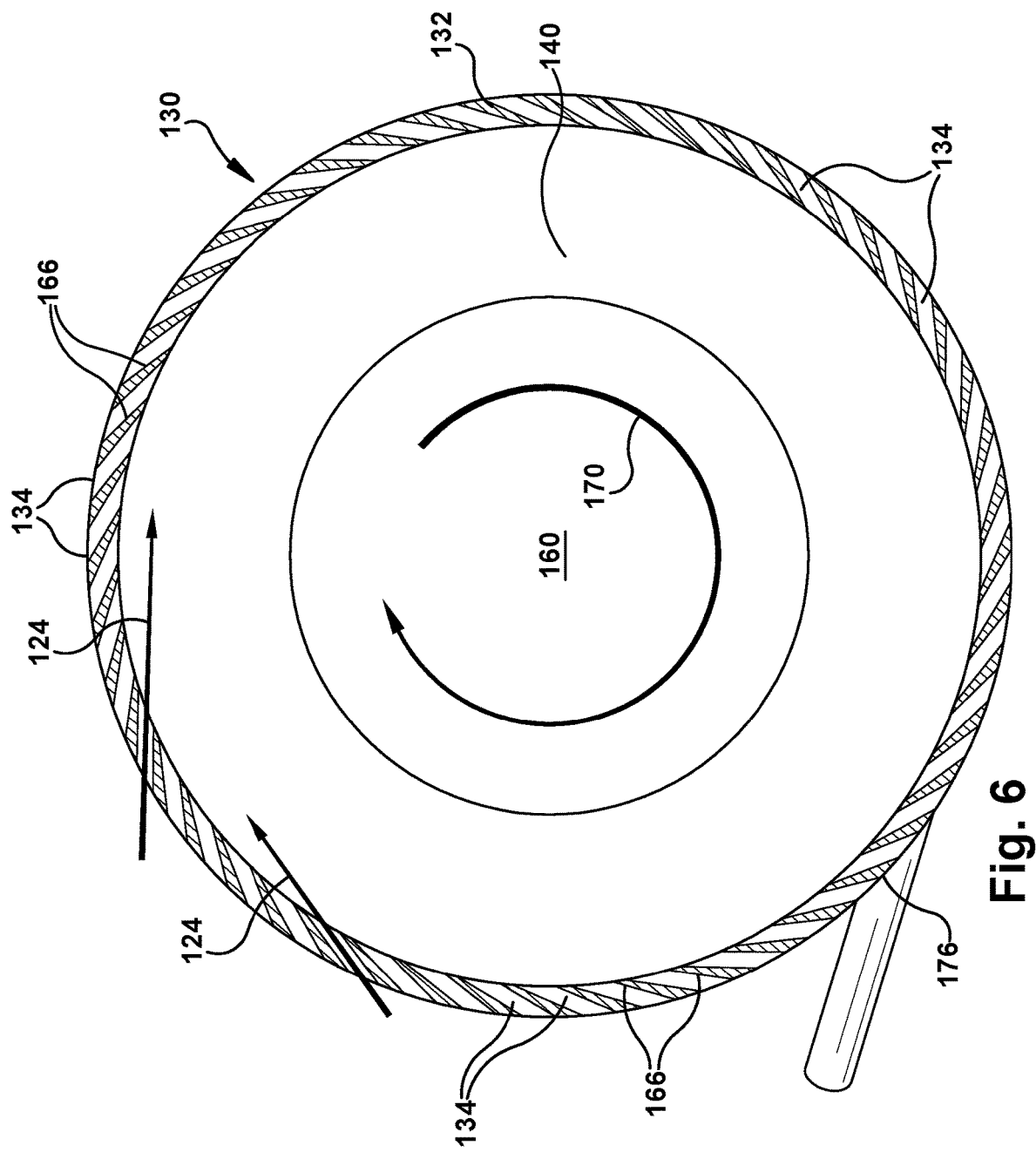
FIG. 6 is a top-down cross-sectional view of the cyclonic particle separator along view line 6-6 in FIG. 4.

FIG. 6 shows a cross-sectional view of separator 126 and, in particular, housing 130 taken along view line 6-6 in FIG. 4. FIG. 6 shows that each of plurality of flow entry ports 134 may include a flow directing surface 166 angled to direct gas flow 124 (arrows) from upstream of housing 130 to enter housing 130 in a tangential direction relative to cylindrical sidewall 132, causing a cyclone vortex 170. In the example application of a turbine system 100 (FIG. 1), gas flow 124 includes compressed air from compressor 102 (FIG. 1); however, it may include other gases in other applications. As will be described herein, features of separator 126 can be selected to optimize the efficiency of cyclone vortex 170 and other aspects of operation to efficiently separate particles from gas flow 124 with minimal pressure drop.

As shown best in FIGS. 4 and 5, separator 126 also includes at least one particle exit passage 176 defined in housing 130 through which particles separated by cyclone vortex 170 from gas flow 124 are ejected from housing 130. Hence, exit passage(s) 176 provide a path for particles to leave housing 130 prior to use of the now cleaner gas flow 144 (FIG. 4). Particle exit passage(s) 176 extends tangentially relative to cylindrical sidewall 132 such that particle momentum from cyclone vortex 170 is not interrupted. Any number of exit passage(s) 176 may be employed. In FIGS. 4 and 5, a single exit passage 176 is shown, which although not necessary, is preferably located adjacent mounting member 140.

Figure 7:
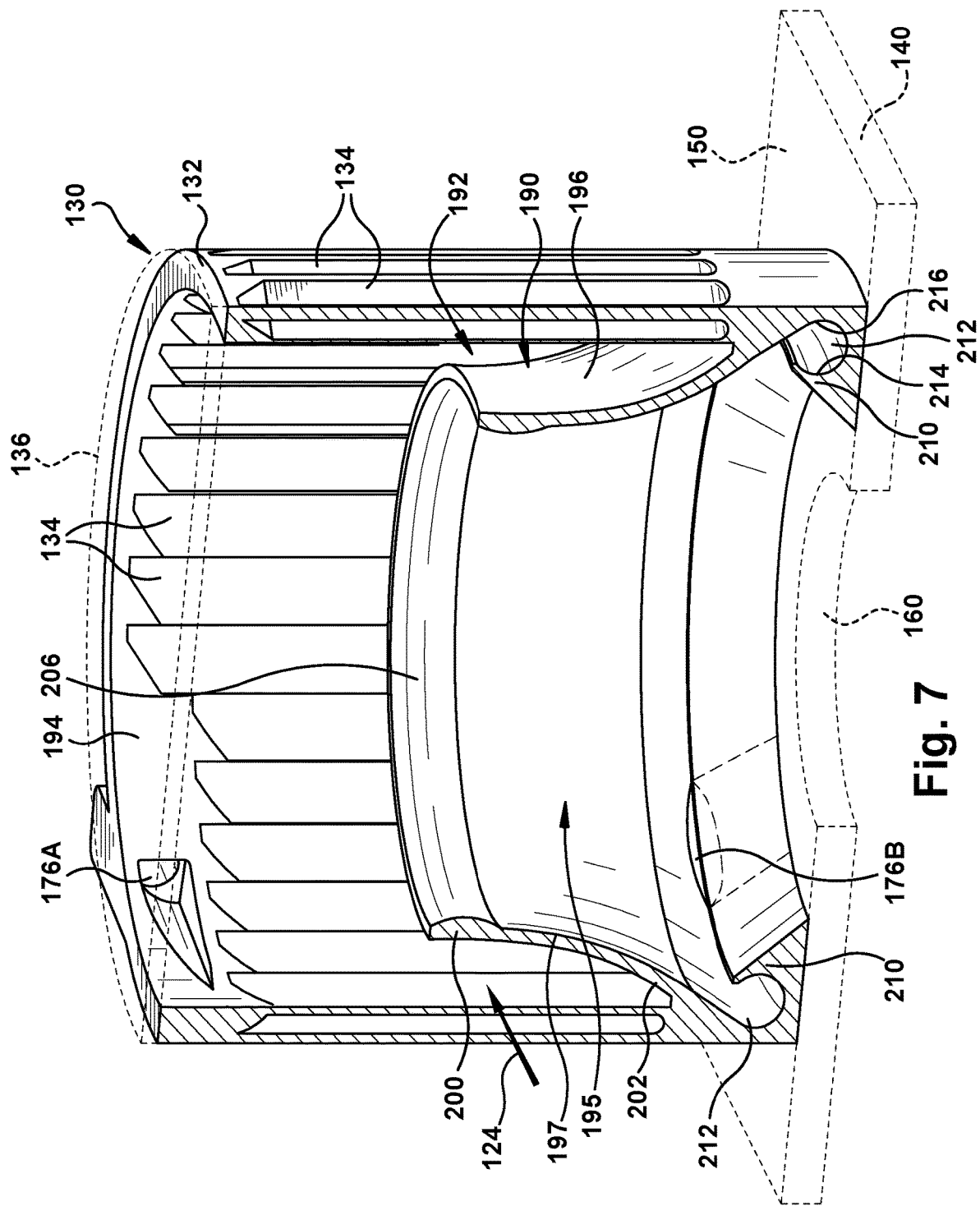
FIG. 7 shows a cross-sectional view of a housing of a cyclonic particle separator, including a number of alternative features.

FIG. 7 shows a cross-sectional view of housing 130 including a number of alternative features. For example, in other embodiments, as shown in FIG. 7, housing 130 may include a first particle exit passage 176A defined in cylindrical sidewall 132 of housing 130 adjacent cover member 136 (shown in dashed lines), and a second particle exit passage 176B defined in cylindrical sidewall 132 of housing 130 adjacent mounting member 140 (shown partially in dashed lines). Exit passage(s) 176 may direct particles to any desired location having a lower pressure than housing 130 for their removal from gas flow 124 (FIG. 4). In one embodiment, shown for example in FIG. 5, particle exit passage(s) 176 may direct particles to a hot gas path 180 (FIGS. 2-5) of turbine 108 (FIG. 1). Here, exit passage(s)

176 may also extend through mounting member 140, e.g., wall 150 of mounting member 140, and be routed to hot gas path 180 through, for example, outer endwall 114. In this manner, particles are removed from gas flow 124 and eliminated via hot gas path 180. In other embodiments, exit passage(s) 176 may direct particles to a collection cavity (not shown).

Figure 8:
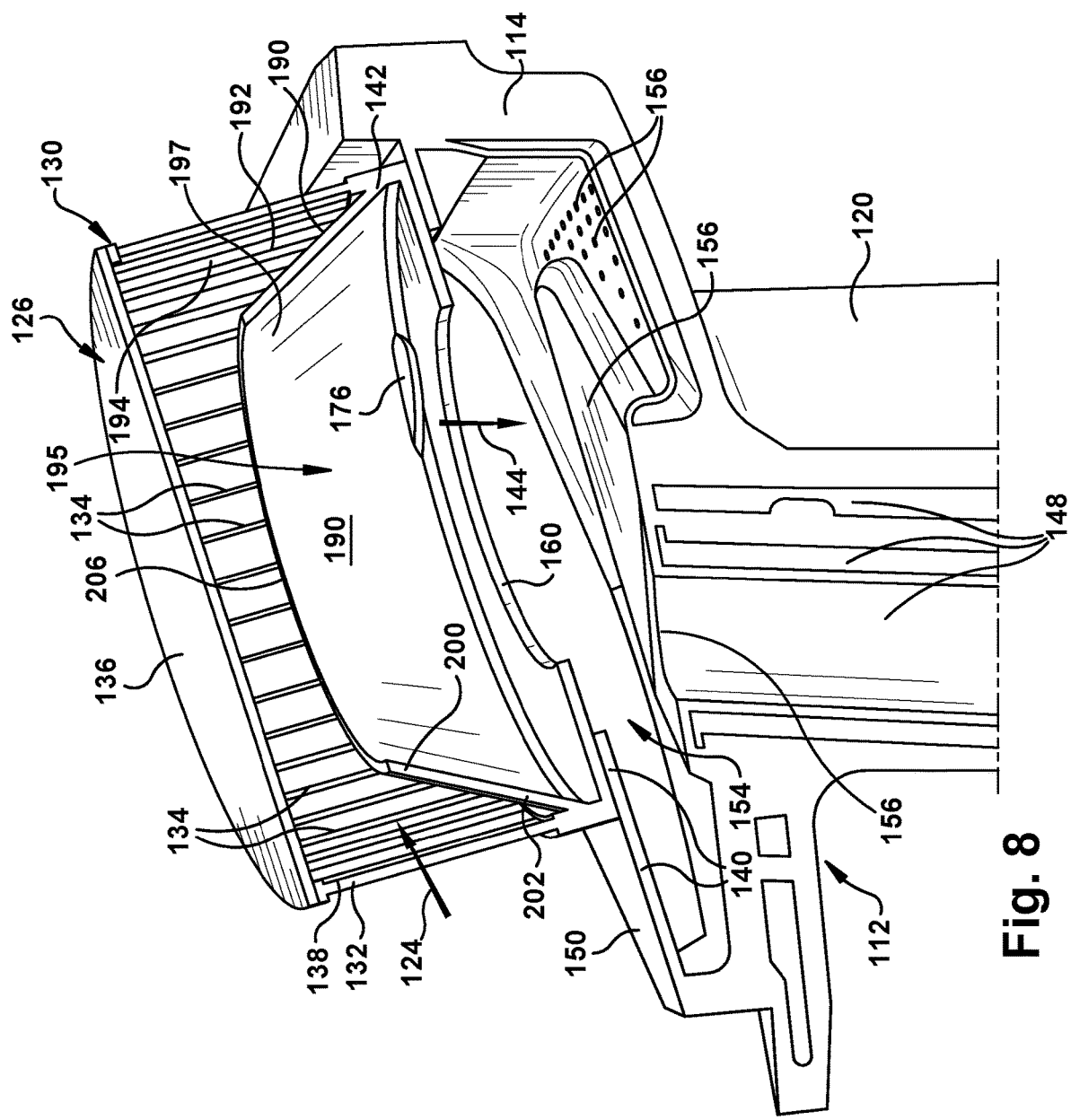
FIG. 8 is a cross-sectional view of the cyclonic particle separator and the turbine vane, according to other embodiments of the disclosure.

FIG. 8 is a cross-sectional view of separator 126 and turbine vane 112 according to other embodiments of the disclosure. In certain embodiments, shown in FIGS. 7 and 8, one or more separators 126 may also include an annular body 190 located within cylindrical sidewall 132. That is, annular body 190 may be located within cylindrical sidewall 132 within at least one of separators 126 in a turbine system 100 (FIG. 1). Annular body 190 defines a cyclonic separating chamber 192 between an interior 194 of cylindrical sidewall 132 and an exterior 196 of annular body 190. Annular body 190 also defines a cyclonic separating chamber 195 between an inner diameter 197 of annular body 190 and mounting member 140. Annular body 190 is generally circular, but can have some difference from exactly circular, e.g., it can be oval.

Annular body 190 may be positioned in a number of ways. In one example, annular body 190 is coupled to cylindrical sidewall 132 near second end 142 of cylindrical sidewall 132, i.e., they are coupled together or formed as one piece. However, other positioning arrangements may be possible. For example, in another arrangement, not shown, annular body 190 may be coupled or formed with mounting member 140 and/or cover member 136. Annular body 190 can be sized and shaped to create a customized cyclonic separating chamber 192 and/or cyclonic separating chamber 195, each of which act to improve removal of particles in an efficient manner without a significant pressure drop. Annular body 190 may be located within cylindrical sidewall 132 within certain separators 126 in turbine system 100 (FIG. 1). In one non-limiting example, separators 126 may be provided on turbine vanes 112 that are on a lower half of turbine 108 (FIG. 1). However, annular bodies 190 may be employed in any separators 126 desired.

In one embodiment, annular body 190 has a smaller end 200 proximate cover member 136 and a larger end 202 proximate mounting member 140. Smaller end 200 is radially outward, and larger end 202 is radially inward relative to rotor 110 (FIG. 2) when separator 126 is coupled to outer endwall 114. Annular body 190 defines a central opening 206 at smaller end 200. In certain embodiments, central opening 206 has a diameter $D_{cone}$ (FIG. 13) that is slightly larger than a diameter $D_{cool}$ (FIG. 13) of flow exit opening 160. However, this is not necessary in all instances. In one embodiment, shown for example in FIG. 8, annular body 190 has a frustoconical shape having smaller end 200 proximate cover member 136 and larger end 202 proximate mounting member 140. Here, annular body 190 generally has a wall that is linear in cross-section from larger end 202 to smaller end 200 (that is, a wall having a constant slope). In contrast, as shown in FIG. 7, annular body 190 may have a generally frustoconical shape with a wall having a curved cross-section (i.e., creating a volcano-like shape), in which any line defined between a point on smaller end 200 proximate to cover member 136 and a corresponding point on larger end 202 proximate to mounting member 140 defines a convex curve. In other words, the cross-sectional diameter of the annular body 190 includes a portion having a first slope coupled to a portion having a second slope different from the first slope. Annular body 190 can have any shapes that forces the flow radially outward and then over the wall and radially inward, e.g., L-shaped.

With continuing reference to FIG. 7, in certain embodiments, separator 126 may also include an annular wall 210 extending between flow exit opening 160 and one of larger end 202 of annular body 190 and cylindrical sidewall 132 of housing 130. Annular wall 210 is generally circular, but can have some difference from exactly circular, e.g., oval, and may have some discontinuities therein. Wall 210 defines an annular particle trap 212 with cylindrical sidewall 132 or larger end 202 of annular body 190. FIGS. 9 and 10 show enlarged cross-sectional views of housing 130 and wall 210. In FIGS. 7 and 9, wall 210 extends between flow exit opening 160 and cylindrical sidewall 132 of housing 130. In this case, larger end 202 of annular body 190 is above wall 210 and not interposed between flow exit opening 160 and cylindrical sidewall 132. Here, cyclonic separating chamber 192 is above (radial outward of) annular particle trap 212. Alternatively, as shown in FIG. 10, wall 210 may extend between flow exit opening 160 and larger end 202 of annular body 190, i.e., cylindrical sidewall 132 is not immediately adjacent wall 210. In this embodiment, cyclonic separating chamber 192 is adjacent annular particle trap 212. In any event, wall 210 defines an annular particle trap 212 with cylindrical sidewall 132 or larger end 202 of annular body 190. Annular particle trap 212 acts to collect particles from the cyclonic flow, and direct them to a particle exit passage(s) 176.

Particle exit passage(s) 176 may be in fluid communication with annular particle trap 212. FIG. 9 shows a single particle exit passage 176 (in dashed lines in annular particle trap 212). In certain embodiments, shown in FIG. 7, one or more particle exit passages 176B may be in fluid communication with annular particle trap 212, and one or more other particle exit passages 176A may be defined in cylindrical sidewall 132 of housing 130 adjacent cover member 136.

Wall 210 may have any shape to create an annular particle trap 212 of a desired shape. In one example, shown in FIGS. 7 and 10, wall 210 has an outwardly curved surface 214 which, with a mating surface 216 of larger end 202 of annular body 190 or cylindrical sidewall 132, creates a torus-shaped particle trap 212. Other shapes of annular particle trap 212 are also possible, e.g., a triangular or rectangular cross-section torus.

Figure 12:
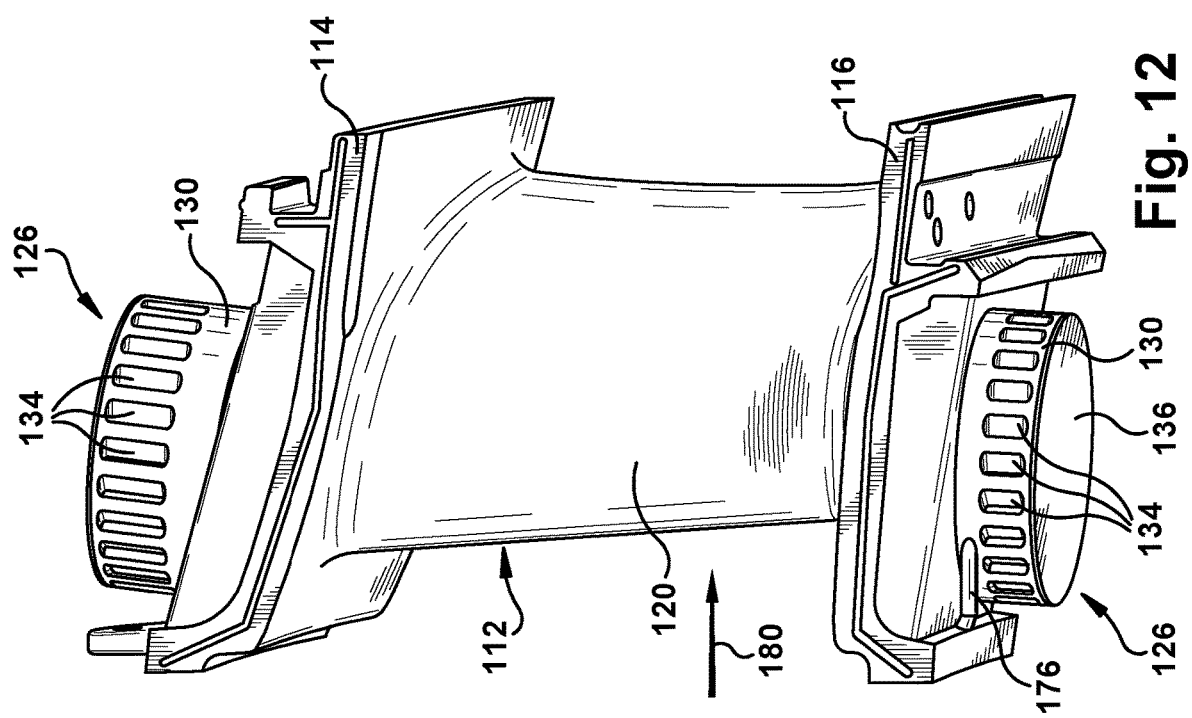
FIG. 12 is a cross-sectional view of two cyclonic particle separators and a turbine vane, according to additional embodiments of the disclosure.
Figure 11:
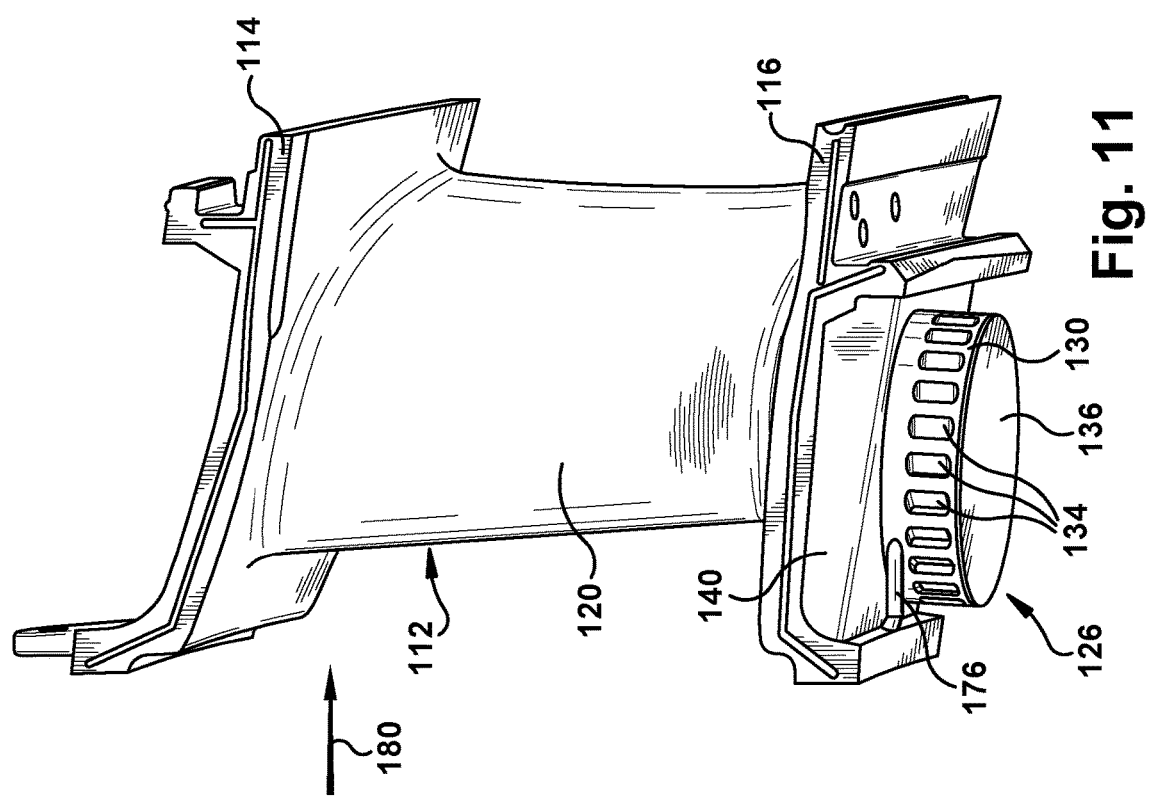
FIG. 11 is a cross-sectional view of the cyclonic particle separator and a turbine vane, according to other embodiments of the disclosure.

As previously described, in one embodiment, housing 130 of separator 126 may be operatively mounted to outer endwall 114 of turbine vane 112 by mounting member 140. As shown in FIG. 11, in another embodiment, housing 130 of separator 126 may be operatively mounted to inner endwall 116 of turbine vane 112 by mounting member 140. Flow exit opening 160 is defined in wall 150 and/or 152 of mounting member 140 and is in fluid communication with cooling circuit 148 downstream of cylindrical sidewall 132 in an interior of airfoil 120 of turbine vane 112. As shown in FIG. 12, in another embodiment, housing 130 of a separator 126 may be operatively mounted to each of outer endwall 114 and inner endwall 116 of turbine vane 112 by a respective mounting member 140. Flow exit opening 160 of each separator 126 is defined in wall 150 and/or 152 of mounting member 140 thereof and is in fluid communication with cooling circuit 148 downstream of cylindrical sidewall 132 in an interior of airfoil 120 of turbine vane 112. Clean gas flow 144 is delivered to both ends of airfoil 120 of turbine vane 112.

In operation, compressed gas flow 124, such as air from compressor 102 (FIG. 1), enters flow entry ports 134 in cylindrical sidewall 132 of separator 126. Gas flow 124 includes particles that are too large for efficient use in, for example, cooling circuit 148 of turbine vane 112, and that need to be removed. Flow directing surfaces 166 of flow entry ports 134 direct gas flow 124 tangentially relative to cylindrical sidewall 132, central opening 206 of annular body 190 (where provided), and flow exit opening 160, which generates cyclone vortex 170. Particles in gas flow 124 are forced outwardly by centrifugal force toward interior 194 of cylindrical sidewall 132, where the particles exit via particle exit passage(s) 176. Cleaned gas flow 144 moves inward at second end 142 of cylindrical sidewall 132 and exits through flow exit opening 160 into, for example, cooling circuit 148 in airfoil 120 of turbine vane 112. Where provided, annular body 190 acts as a hollow flow deflecting feature inside cylindrical sidewall 132 that causes the flow to move radially outward and over annular body 190. Annular body 190 thus elongates the flow path that particles travel and limits line of sight from entry ports 134 to flow exit opening 160, allowing aerodynamic drag to accelerate particles in the circumferential direction and thus increase centrifugal inertia that leads to particle separation from the flow. Cyclonic flow travels over first radial outer end 200 of annular body 190, through central opening 206 in radial outer end 200, and then outwardly towards second end 142 of cylindrical sidewall 132. Particles are thus centrifuged outward adjacent cylindrical sidewall 132 near second end 142 thereof. Particle exit passage(s) 176 allows removal of the particles, e.g., tangentially so as not to impede flow. Cleaner gas flow 144 exits through flow exit opening 160.

Figure 13:
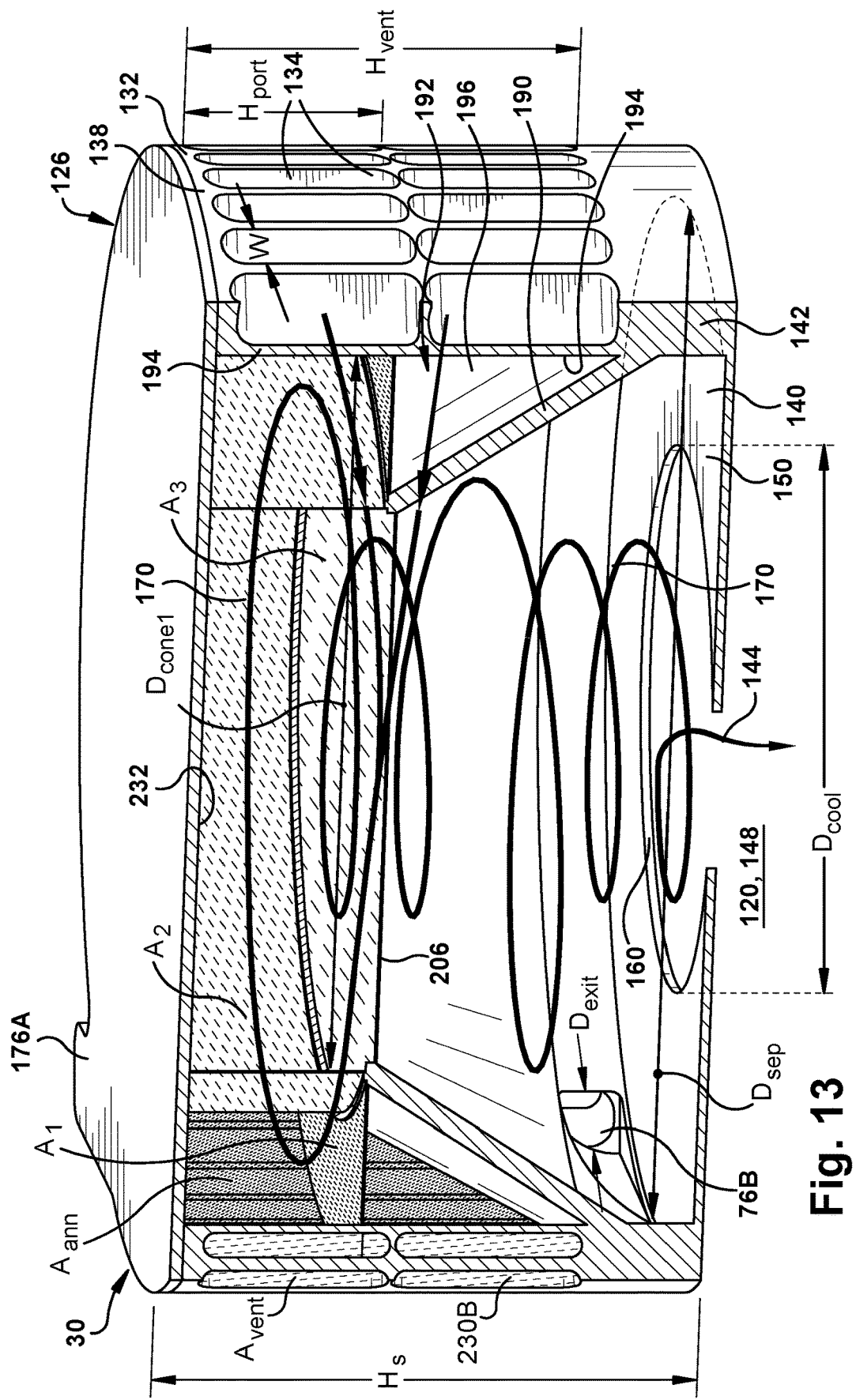
FIG. 13 is an enlarged cross-sectional view of a separator with a number of dimensional aspects highlighted for description purposes.

FIG. 13 shows an enlarged cross-sectional view of separator 126 with a number of dimensional aspects of separator 126 highlighted for description purposes. As noted, separator 126 may include housing 130 including cylindrical sidewall 132 having plurality of flow entry ports 134 defined therethrough, cover member 136 closing first end 138 of cylindrical sidewall 132, and mounting member 140 at second end 142 of cylindrical sidewall 132. Flow exit opening 160 may be defined in mounting member 140, e.g., wall 150 thereof. At least one particle exit passage 176 is defined in housing 130. Controlling the sizing of certain aspects of separator 126 can provide advantages relative to maximizing particle separation efficiency and minimizing pressure losses.

As shown in FIG. 13, cylindrical sidewall 132 may have a diameter $D_{sep}$, and flow exit opening 160 may have a diameter $D_{cool}$. In order to provide efficient particle separation with low pressure drop, one dimensional aspect of separator 126 may be to control a difference between diameter $D_{sep}$ and diameter $D_{cool}$ so it is greater than 12.5 millimeters (approximately 0.5 inches). In one embodiment, the difference may be greater than 25 millimeters (approximately 1.0 inches). In another embodiment, the difference may be greater than 37.5 millimeters (approximately 1.5 inches). Generally, the greater difference in diameters $D_{sep}$ and diameter $D_{cool}$, the more time particles can accelerate in cyclone vortex 170 and move radially outward toward cylindrical sidewall 132 and exit passage(s) 176. Flow exit passage 160 diameter $D_{cool}$ may be sized based on a required volume of cleaner gas flow 144 for cooling circuit 148 and an allowable pressure drop. In various embodiments, cylindrical sidewall 132 diameter $D_{sep}$ is significantly larger than flow exit opening 160 diameter $D_{cool}$, i.e., greater than 2 times the size.

It is also advantageous to maximize the diameter $D_{sep}$ and $D_{cool}$ and height $H_s$ of separator 126 within an allowable design envelope. Diameter $D_{sep}$ and height $H_s$ are components of an inner annulus area $A_{ann}$, which is the area of interior 194 (surface) of cylindrical sidewall 132 including that of flow entry ports 134 (i.e., cylindrical area). Stated in another way, the larger the inner annulus areas $A_{ann}$, the greater the circumferential velocity portion of cyclone vortex 170 compared to a radial velocity portion of cyclone vortex 170, which leads to greater particle separation. Hence, a larger inner annulus area $A_{ann}$ positively affects separation efficiency while minimizing pressure drop. In one example, 75% or more of particles were removed, resulting in a four times (4×) increase in durability of, for example, cooling circuit 148 in airfoil 120 and other structure.

Controlling a sum of areas ($A_{vent}$) of flow entry ports 134 can also positively impact particle separation efficiency. In one embodiment, inner annulus area $A_{ann}$ is at least 1.5 times (1.5×) the sum of areas $A_{vent}$ of flow entry ports 134. In certain embodiments, inner annulus area $A_{ann}$ is at least 2.0 times (2×) the sum of areas $A_{vent}$ of flow entry ports 134. Flow entry port 134 height $H_{vent}$ is also ideally maximized within allowable housing height $H_s$, providing space for annular body 190 (where provided), exit passage(s) 176 and any necessary interconnection structure, e.g., walls 152 (FIG. 5) of mounting member 140. Flow entry port 134 count, individual height $H_{port}$, width W and eccentric offset (angle of flow directing surfaces 166 (FIG. 6)) may be based on an application-specific required flow area. In addition, as shown in FIG. 6, these parameters can be controlled to preferably mitigate line of sight of gas flow 124 relative to flow exit opening 160 to create a tangential flow relative to cylindrical sidewall 132 and to create cyclone vortex 170 with a strong circumferential velocity portion.

Controlling a size and orientation of particle exit passage(s) 176 may also aid in efficient particle separation. In this regard, in certain embodiments, particle exit passage(s) 176 defined in cylindrical sidewall 132 each have a diameter $D_{exit}$ of greater than or equal to 0.76 millimeters (approximately 0.030 inches). In one non-limiting example, particle exit passage(s) 176 defined in cylindrical sidewall 132 each have diameter $D_{exit}$ of greater than or equal to 5.59 millimeters (approximately 0.22 inches).

In those embodiments in which annular body 190 is located within cylindrical sidewall 132 to define annular cyclonic separating chamber 192 between interior 194 of cylindrical sidewall 132 and exterior 196 of annular body 190, certain dimensional aspects of separator 126 can be engineered to further control the pressure drop across separator 126. For example, in certain embodiments, an annular area $A_1$ between radial outer end 200 of annular body 190 and interior 194 of cylindrical sidewall 132 can be at least as large as the sum of areas $A_{vent}$ of flow entry ports 134. In one non-limiting example, annular area $A_1$ may be four times (4×) the sum of areas $A_{vent}$ of flow entry ports 134. Annular area $A_1$ controls a size of cyclonic separating chamber 192, thus controlling the pressure drop created thereby. In another example, in certain embodiments, a radially extending area $A_2$ between radial outer end 200 of annular body 190 and an interior 232 of cover member 136 (cylindrical area) may be at least as large as the sum of areas $A_{vent}$ of flow entry ports 134. In one non-limiting example, the radially extending area $A_2$ may be between 4 and 6 times the sum of areas $A_{vent}$ of flow entry ports 134. Because radially extending area $A_2$ controls a radial extent of cyclonic separating chamber 192, controlling this area controls the extent to which cyclone vortex 170 can extend radially and the pressure drop allowed by this space. In another example, in certain embodiments, an area $A_3$ of central opening 206 defined in annular body 190 (i.e., at radial outer end 200) is at least as large as the sum of areas $A_{vent}$ of flow entry ports 134. In one non-limiting example, area $A_3$ may be four times (4×) the sum of areas $A_{vent}$ of flow entry ports 134. Area $A_3$ is the size of central opening 206 in annular body 190, which controls a pressure drop generated by central opening 206 in separator 126.

Figure 14:
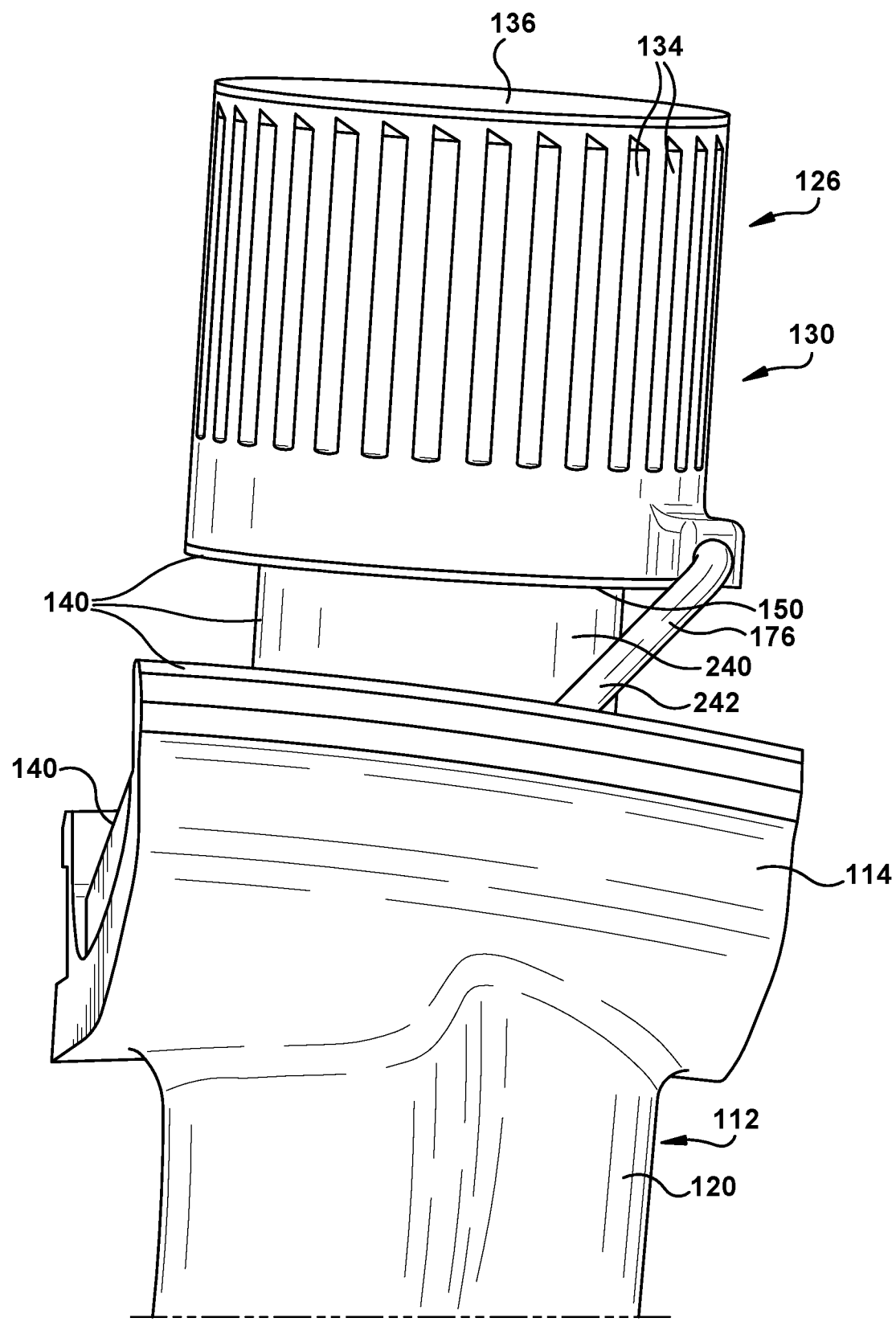
FIG. 14 is a perspective view of a cyclonic particle separator, according to other embodiments of the disclosure.

FIG. 14 is a perspective view of separator 126 according to other embodiments of the disclosure. In this case, separator 126 extends radially outward of outer endwall 114 to a greater extent than shown in FIGS. 4-13. Here, mounting member 140 includes an extension conduit 240 from flow exit opening (not shown, inside wall 150). Particle exit passage 176 also has a dedicated conduit 242 to reach outer endwall 114 because wall 150 is not immediately adjacent outer endwall 114. As noted, mounting member 140 can take a variety of forms to accommodate use of separator 126 in different locations and applications.

Separator 126 may be manufactured using any now known or later developed technology. Advantageously, separator 126 can be additively manufactured, e.g., using direct metal laser melting (DMLM) techniques.

Embodiments of the disclosure provide a cyclonic particle separator 126 that minimizes contaminants and that can reduce maintenance costs, extend the life, and increase reliability and durability of, for example, a turbine vane 112 (FIG. 3) or a turbine blade 123 (FIG. 14). Separator 126 can also advantageously be readily retrofitted to older vanes and blades to extend the life thereof. The size of separator 126 is such that it fits into tight spacing in many industrial machines such as, but not limited to, a gas turbine system 100.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A cyclonic particle separator, comprising:
   a housing including:
      a cylindrical sidewall having a plurality of flow entry ports defined therethrough,
      a cover member closing a first end of the cylindrical sidewall, and
      a mounting member at a second end of the cylindrical sidewall and having a flow exit opening defined therethrough; and
   at least one particle exit passage defined in the housing
   an annular body located within the cylindrical sidewall, the annular body defining a cyclonic separating chamber between an interior of the cylindrical sidewall and the annular body;
   a wall extending around the flow exit opening to define an annular particle trap with the cylindrical sidewall and the annular body, wherein the at least one particle exit passage includes a first particle exit passage in fluid communication with the annular particle trap; and
   wherein each of the plurality of flow entry ports includes a flow directing surface angled to direct a gas flow from upstream of the housing to enter the housing in a tangential direction relative to the cylindrical sidewall, causing a cyclone vortex within the housing, and
   wherein the housing is operatively mounted to one of an inner endwall and an outer endwall of a turbine vane by the mounting member.

2. The cyclonic particle separator of claim 1, wherein the annular body has a smaller end proximate to the cover member and a larger end proximate to the mounting member.

3. The cyclonic particle separator of claim 2, wherein the annular body has a frustoconical shape oriented with the smaller end proximate to the cover member and the larger end proximate to the mounting member.

4. The cyclonic particle separator of claim 2, wherein the wall defining the annular particle trap with the cylindrical sidewall is between the flow exit opening and one of the larger end of the annular body and the cylindrical sidewall.

5. The cyclonic particle separator of claim 4, wherein the annular particle trap has a torus shape.

6. The cyclonic particle separator of claim 1, wherein the at least one particle exit passage includes a first particle exit passage defined in the cylindrical sidewall of the housing adjacent the cover member, and a second particle exit passage defined in the cylindrical sidewall of the housing adjacent the mounting member.

7. The cyclonic particle separator of claim 1, wherein the at least one particle exit passage includes a single particle exit passage adjacent the mounting member.

8. The cyclonic particle separator of claim 1,
   wherein the flow exit opening is defined in a wall of the mounting member and is in fluid communication with
   a cooling circuit downstream of the housing in an interior of an airfoil of the turbine vane.

9. A turbine vane, comprising:
   an inner endwall;
   an outer endwall; and
   an airfoil coupling the inner endwall and the outer endwall; characterized in that the turbine vane has:
   a cyclonic particle separator including:
      a housing including:
         a cylindrical sidewall having a plurality of flow entry ports defined therethrough,
         a cover member closing a first end of the cylindrical sidewall, and a mounting member at a second end of the cylindrical sidewall configured to couple the housing to one of the inner endwall and the outer endwall, wherein the mounting member has a flow exit opening defined therethrough and in fluid communication with a cooling circuit downstream of the housing in an interior of the airfoil; and at least one particle exit passage defined in the housing;

an annular body located within the cylindrical sidewall, the annular body defining a cyclonic separating chamber between an interior of the cylindrical sidewall and the annular body;

an annular wall extending around the flow exit opening to define an annular particle trap with the cylindrical sidewall and the annular body, wherein the at least one particle exit passage includes a first particle exit passage in fluid communication with the annular particle trap; and wherein each of the plurality of flow entry ports includes a flow directing surface angled to direct a gas flow from upstream of the housing to enter the housing in a tangential direction relative to the cylindrical sidewall, causing a cyclone vortex within the housing.

10. The turbine vane of claim 9, wherein the annular body has a smaller end proximate to the cover member and a larger end proximate to the mounting member.

11. The turbine vane of claim 10, wherein the annular body has a frustoconical shape oriented with the smaller end proximate to the cover member and the larger end proximate to the mounting member.

12. The turbine vane of claim 10, wherein the annular wall defining the annular particle trap with the cylindrical sidewall is between the flow exit opening and one of the larger end of the annular body and the cylindrical sidewall.

13. The turbine vane of claim 12, wherein the annular particle trap has a torus shape.

14. The turbine vane of claim 9, wherein the at least one particle exit passage includes a first particle exit passage defined in the cylindrical sidewall adjacent the cover member, and a second particle exit passage defined in the cylindrical sidewall adjacent the mounting member.

15. A turbine system, comprising:
an engine core including a compressor, a combustor, and a turbine operatively coupled together, the turbine including a turbine stage having a plurality of vanes, each vane of the turbine stage including an inner endwall, an outer endwall, and an airfoil coupling the inner endwall and the outer endwall; characterized in that the turbine has:

a cyclonic particle separator mounted to at least one of the inner endwall and the outer endwall of each vane, the cyclonic particle separator comprising a housing including:
a cylindrical sidewall having a plurality of flow entry ports defined therethrough,
a cover member closing a first end of the cylindrical sidewall, and
a mounting member at a second end of the cylindrical sidewall configured to couple the housing to one of the inner endwall and the outer endwall, wherein the mounting member has a flow exit opening defined therethrough and in fluid communication with a cooling circuit downstream of the housing in an interior of the airfoil; and at least one particle exit passage defined in the housing;
an annular body located within the cylindrical sidewall within at least one of the cyclonic particle separators, the annular body defining a cyclonic separating chamber between an interior of the cylindrical sidewall and the annular body; and an annular wall extending around the flow exit opening to define an annular particle trap with the cylindrical sidewall and the annular body, wherein the at least one particle exit passage includes a first particle exit passage in fluid communication with the annular particle trap.

16. The turbine system of claim 15, wherein the annular body has a smaller end proximate to the cover member and a larger end proximate to the mounting member.

17. The turbine system of claim 16, wherein the annular body has a frustoconical shape oriented with the smaller end proximate to the cover member and the larger end proximate to the mounting member.

18. The turbine system of claim 16, wherein the annular wall defining the annular particle trap with the cylindrical sidewall is between the flow exit opening and one of the larger end of the annular body and the cylindrical sidewall.

19. The turbine system of claim 15, wherein the at least one particle exit passage includes a first particle exit passage defined in the cylindrical sidewall adjacent the cover member; and a second particle exit passage defined in the cylindrical sidewall adjacent the mounting member.

20. The turbine system of claim 15, further comprising a conduit fluidly coupling the at least one particle exit passage to a hot gas path of the turbine.

* * * * *